United States Patent
Nifenecker et al.

(10) Patent No.: US 11,952,925 B2
(45) Date of Patent: Apr. 9, 2024

(54) INTEGRAL CENTRIFUGAL DEGASSER

(71) Applicant: SAFRAN HELICOPTER ENGINES, Paris (FR)

(72) Inventors: Arnaud Nifenecker, Moissy-Cramayel (FR); Frédéric Bonnet, Moissy-Cramayel (FR); Pierre Gaymu, Moissy-Cramayel (FR); Rémi Lanquetin, Moissy-Cramayel (FR); Benjamin Fulleringer, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 622 days.

(21) Appl. No.: 17/257,212

(22) PCT Filed: Jul. 5, 2019

(86) PCT No.: PCT/FR2019/051667
§ 371 (c)(1),
(2) Date: Dec. 30, 2020

(87) PCT Pub. No.: WO2020/008153
PCT Pub. Date: Jan. 9, 2020

(65) Prior Publication Data
US 2021/0131322 A1    May 6, 2021

(30) Foreign Application Priority Data

Jul. 5, 2018 (FR) ...................................... 1856182

(51) Int. Cl.
*F01M 11/08* (2006.01)
*B01D 45/14* (2006.01)
(Continued)

(52) U.S. Cl.
CPC .............. *F01M 11/08* (2013.01); *B01D 45/14* (2013.01); *B04B 7/18* (2013.01); *B33Y 80/00* (2014.12)

(58) Field of Classification Search
CPC .......... F01M 11/08; B04B 7/18; B01D 45/14; B01D 45/00; B01D 50/00; B01D 19/00
See application file for complete search history.

(56) References Cited

U.S. PATENT DOCUMENTS

| 5,429,208 A | 7/1995 | Argillier et al. |
| 6,033,450 A * | 3/2000 | Krul ....................... B01D 45/14 |
| | | 55/438 |

(Continued)

FOREIGN PATENT DOCUMENTS

| EP | 0626503 B1 | 11/1995 |
| EP | 3011156 A1 | 4/2016 |

OTHER PUBLICATIONS

International Search Report dated Sep. 25, 2019 issued in corresponding International Application No. PCT/FR2019/051667, filed Jul. 5, 2019, 4 pages.

*Primary Examiner* — Walter D. Griffin
*Assistant Examiner* — Cameron J Allen
(74) *Attorney, Agent, or Firm* — Christensen O'Connor Johnson Kindness PLLC

(57) ABSTRACT

A centrifugal degasser of an air-oil mixture of a turbine engine includes a hollow shaft extending along an X axis and a pinion for rotating the hollow shaft, and an annular chamber for centrifugal separation of the mixture. The chamber is arranged around the hollow shaft and forms a fluid passage area, an inlet of which is oriented axially for feeding the chamber with the mixture, and a first outlet of which is oriented radially inwards for the outlet of the de-oiled air separated from said mixture. The chamber also includes at least one second oil outlet oriented radially (Continued)

outwards and configured for discharging the oil separated from said mixture to the outside of the degasser. The chamber and the pinion form a single piece.

11 Claims, 3 Drawing Sheets

(51) Int. Cl.
*B04B 7/18* (2006.01)
*B33Y 80/00* (2015.01)

(56) References Cited

U.S. PATENT DOCUMENTS

| | | | |
|---|---|---|---|
| 2004/0098956 A1* | 5/2004 | Care | B01D 46/003 55/400 |
| 2005/0211093 A1* | 9/2005 | Latulipe | F01D 25/18 55/400 |
| 2016/0138444 A1 | 5/2016 | Prunera-Usach et al. | |
| 2017/0218848 A1* | 8/2017 | Alstad | B64D 41/00 |

\* cited by examiner

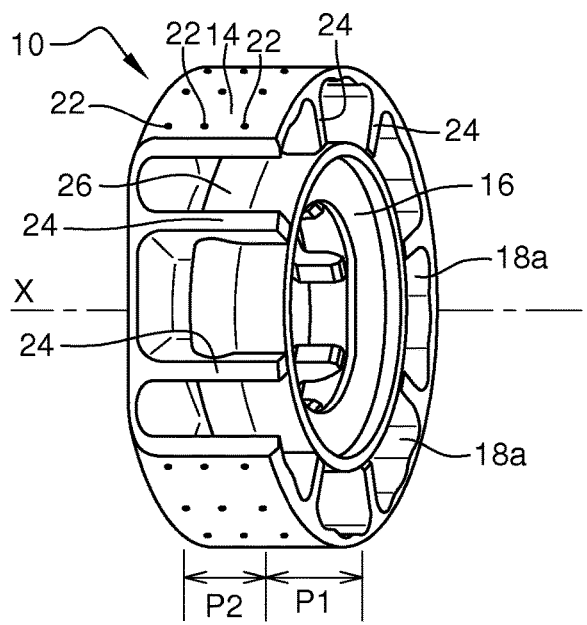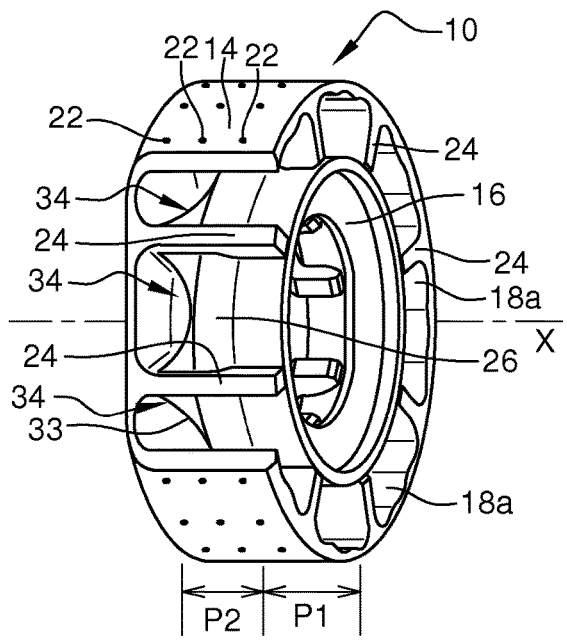
Fig. 3a      Fig. 3b
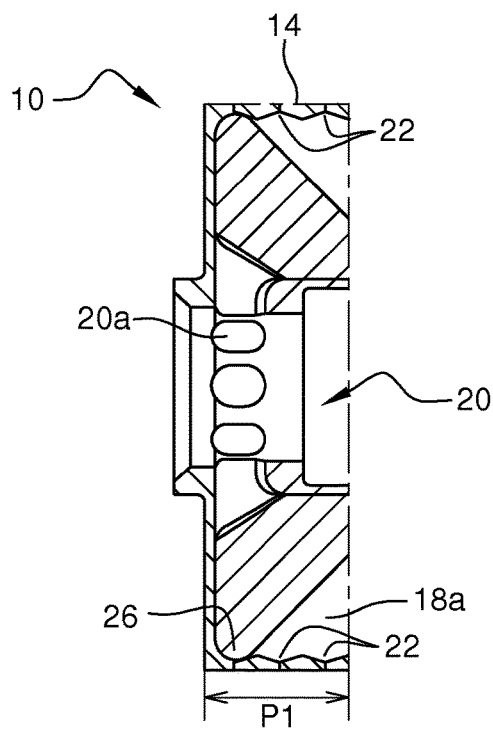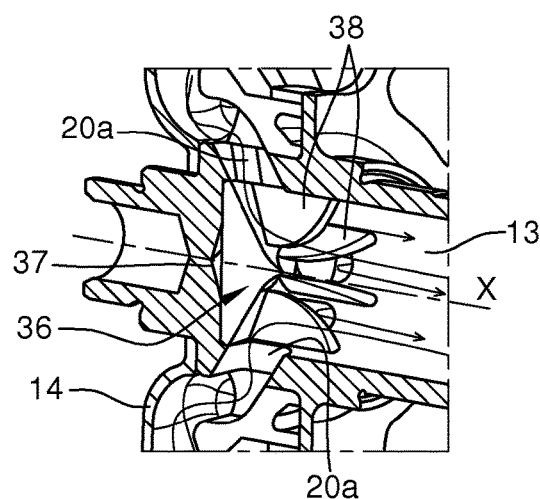
Fig. 3c      Fig. 4

INTEGRAL CENTRIFUGAL DEGASSER

TECHNICAL FIELD

Embodiments of the present disclosure relate to a centrifugal degasser of a turbomachine.

BACKGROUND

The prior art comprises the following documents: US-A1-2004/098956, US-A1-2005/211093, EP-A1-0 626 503, US-A1-2017/218848, EP-A1-3 011 156 A1, and U.S. Pat. No. 6,033,450.

Turbomachines are complex systems with a number of rotating assemblies (turbine, compressor, etc.) which must be equipped with sealing devices. These sealing devices are generally made by labyrinths of pressurized air in the vicinity of the rotating assemblies. For this purpose, air is taken directly from the air vein of the turbomachine. This air then passes through the turbomachine via the various labyrinths provided for this purpose, and is then discharged to the outside of the turbomachine to limit the rise in pressure in the other areas of the turbomachine, in particular the reduction gearbox, the accessory gearbox, etc.

As this air has passed through different areas of the turbomachine, it is charged with oil which is used for cooling and lubricating the bearings and pinions of the rotating assemblies. In order to avoid the discharge of oil-charged air, to reduce the ecological impact of the turbomachines, to reduce oil consumption and to limit the filling of oil reserves, it is important to provide degassers which allow the oil to be separated from the air before discharging the air to the outside of the turbomachine.

Such a degasser is usually fitted and driven by a mechanical power take-off at the accessory gearbox or reduction gearbox of the turbomachine.

In a known manner, such a centrifugal degasser comprises one or more centrifugal air/oil mixture separation chamber(s) arranged to form an air circulation vein(s), arranged around a hollow shaft and delimited by an outer annular wall and an inner annular wall. The degasser further comprises an axial inlet for feeding the chamber with the air/oil mixture, at least one peripheral radial external oil outlet arranged in the external wall and an internal radial de-oiled air outlet arranged in the internal annular wall or between the internal and external annular walls. Thus, when the degasser is set in rotation, conventionally obtained via a pinion in the accessory gearbox or reduction gearbox, the oil is naturally driven by centrifugal force towards the peripheral oil outlet(s) of the degasser and the de-oiled air is discharged via the hollow shaft to the outside of the degasser.

However, the performance of known degassers is generally handicapped by internal pressure losses due to:
  in particular the shape of the vein of the centrifuge chamber, taken by the flow of air during de-oiling, and
  the presence of a metallic foam in the vein of the chamber.

The metal foam has a filtering function and serves to retain the oil that is not discharged by centrifugation, allowing an optimization of the air cleaning but generating, as mentioned above, pressure drops.

Furthermore, as the degasser is attached to the pinion which drives it, the necessary connection of the degasser to the pinion implies the use of a nut which adds mass to the assembly and, moreover, considering two separate parts prevents any optimization in terms of overall mass.

In order to ensure the continuity of the air vein, openings or slots must be made in the pinion disc and anti-rotation systems must also be added to the assembly formed by the pinion and the degasser in order to ensure satisfactory indexing of the degasser on the pinion. In the prior art, the connection between the degasser and the pinion does not allow the air vein to be fully optimized and there remain discontinuities, generating pressure losses. The integration of the degasser on the pinion therefore does not allow maximum working freedom on the air flow sections and the transit speeds of the air/oil mixture in the degasser cannot be minimized.

The manufacturing process can then be limited in terms of the potential for optimum geometry to be achieved with regard to the shape of the vein.

As an example, the foundry allows the generation of complex shapes, limiting the pressure drop, but makes the integration of complex metal foams or degrades the gain. According to another example, conventional machining allows the integration of metallic foams but limits the freedom in the generation of air vein shapes and multiplies the number of part references.

With regard to the presence of metal foam, the pressure losses are due to the fact that at high speeds (e.g. 6000 rpm), the front surface of the metal foam acts like a wall and the degree of penetration of air particles into the foam is low. Known manufacturing processes, e.g. using a specific foam, do not allow the geometry of the structure to be controlled.

It is difficult to find a solution which combines the technological requirements and the means of production compatible with the two aspects of minimizing pressure losses and optimizing the de-oiling capacity.

There is therefore a need to design a degasser with a manufacturing process that allows an efficient oil droplet capture rate, a certain degree of freedom in terms of the geometries chosen to circulate the air flow during de-oiling, to limit pressure drops, particularly due to discontinuities in the air/oil mixture circulation vein, and to minimize the mass of the assembly.

Objectives of the Disclosure

The disclosure aims to provide a degasser design meeting the above-mentioned need to obtain a centrifugal degasser for turbomachines which has improved performance compared to known degassers.

SUMMARY OF THE DISCLOSURE

For this purpose, the disclosure relates to a centrifugal degasser of an air/oil mixture of a turbomachine, comprising a hollow shaft extending along an axis X and defining an internal air circulation cavity, a pinion for rotating the hollow shaft, and an annular chamber for centrifugal separation of the mixture, the chamber being arranged around the hollow shaft and forming a fluid passage vein, an inlet of which is oriented axially for feeding the chamber with the mixture, and a first outlet of which is oriented radially inwards for the exit of the de-oiled air separated from the mixture, this first outlet being in fluid communication with the internal cavity of the hollow shaft for discharging the de-oiled air to the outside of the degasser, the chamber further comprising at least one second oil outlet oriented radially outwards and intended for discharging the oil separated from the mixture to the outside of the degasser, the degasser being characterized in that the chamber and the pinion form a single piece.

In this way, it is possible to optimize the entire degasser from a mass point of view (there is now only one reference to be managed, which allows the mass to be taken into account as a whole), and to optimize the continuity of the air vein formed by the chamber, thus limiting pressure losses.

The degasser according to the disclosure may also have one or more of the following characteristics, taken alone or in combination with one another:

the degasser may be made by additive manufacture,
the chamber may form a bend and may comprise two annular parts, a first annular part substantially parallel to the axis X and a second annular part extending generally radially towards the axis X,
a lattice-like honeycomb structure in additive manufacture can be housed in the chamber or bend,
the honeycomb structure has an evolving shape, so as to vary the texture and/or porosity of the honeycomb structure, radially and/or axially,
the structure can form a single piece with the chamber and the pinion,
the first outlet can be placed into fluid communication with the internal cavity of the hollow shaft by means of a vortex inhibitor, the vortex inhibitor being formed in one piece with the chamber and the pinion,
the pinion can be arranged axially along the wall and comprise at least one axial opening for the passage of the air/oil mixture, which is in fluid communication with the inlet,
the pinion may be arranged at the inlet of the chamber and comprise at least one axial opening for the passage of the air/oil mixture, which is in fluid communication with the inlet,
the chamber may comprise two annular walls, respectively inner and outer, defining between them the vein and connected by an annular row of substantially radial partitions which define between them degassing compartments, each annular wall being generally U-shaped in cross-section and at least one of the annular walls being connected to the partitions by an annular web of material which has an annular row of notches in the shape of an arc of a circle, each notch extending between two adjacent partitions and being shaped so that its ends are connected to the adjacent partitions and its concave portion is located opposite an annular wall and defines a fluid passage therewith.

Embodiments of the present disclosure also relate to a method for producing a degasser as described above, comprising a phase of simultaneous additive manufacture of the pinion and the chamber.

DESCRIPTION OF THE DRAWINGS

Other purposes, characteristics and advantages of the disclosure will be apparent from the following description, which is given only in a non-exhaustive manner and which refers to the annexed figures in which:

FIGS. 3a and 3b are schematic perspective views of a degasser chamber according to the disclosure, in two different embodiments;

FIG. 3c is a schematic radial section view of a degasser chamber, according to a third embodiment;

FIG. 4 is a schematic axial section view of a variant of a degasser according to the disclosure comprising a vortex inhibitor.

DETAILED DESCRIPTION

In the figures, scales and proportions are not strictly adhered to for the sake of illustration and clarity.

Figure 1:
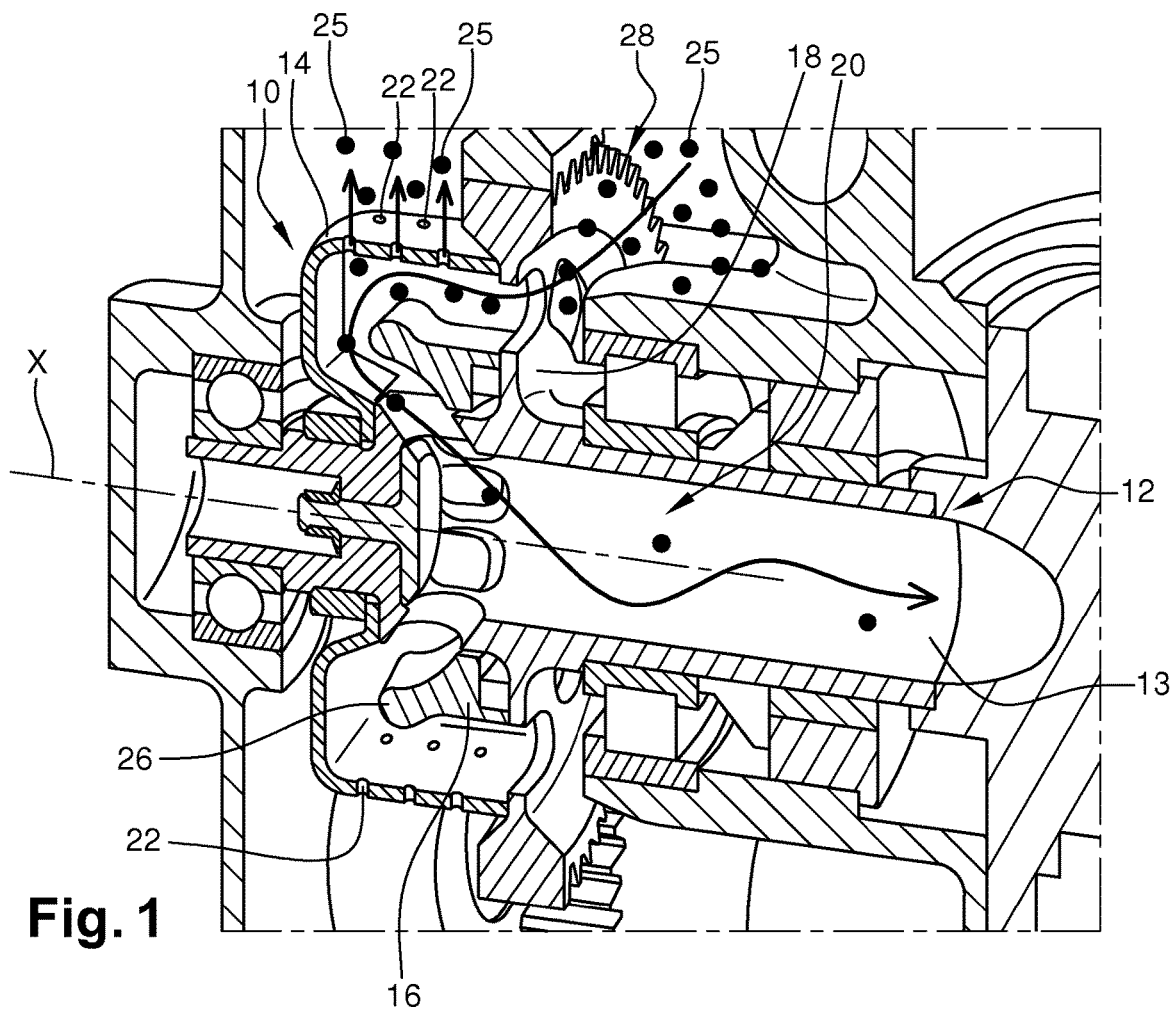
FIG. 1 is a schematic axial section view of a degasser according to the prior art in a turbomachine.

A degasser according to the disclosure comprises, as shown in FIG. 1, a set of parts which are movable in rotation about a central axis of rotation X (which is, in this case, also an axis of symmetry). Among these parts is an annular chamber 10 for centrifugal separation of an air/oil mixture arranged around a hollow shaft 12.

The hollow shaft 12 extends along the axis X. It comprises an internal cavity 13, here substantially cylindrical.

The annular chamber 10 comprises an outer annular wall 14 and an inner annular wall 16. Each annular wall 14, 16 is generally U-shaped in cross-section and thus the chamber 10 comprises a first annular part P1 which extends essentially axially, for centrifuging the mixture. It is in this first part P1 that the centrifugal force is exerted with the greatest force on the air/oil mixture. The vein has a second annular part P2, oriented radially towards the axis X, which connects to the cavity 13 of the hollow shaft 12. The two parts P1, P2 of the vein form a bend 26 which can form a right angle.

In the embodiment shown in FIG. 3c, the second annular part P2 can be reduced in length, e.g. reduced to the strict thickness required for the manufacture of the chamber 10.

The chamber forms a fluid passage vein with an axially oriented inlet 18 for feeding the chamber with the air/oil mixture and a radially inwardly oriented outlet 20 allows the exit the de-oiled air separated from the air/oil mixture. This first outlet 20 is in fluid communication with the internal cavity 13 of the hollow shaft 12 and thus allows the de-oiled air to be discharged to the outside of the degasser, through the hollow shaft 12. The chamber 10 also comprises at least one second oil outlet 22, directed radially outwards, for discharging the oil separated from the air/oil mixture to the outside of the degasser.

Chamber 10 is divided into a plurality of degassing compartments distributed circumferentially around the axis X. The compartments are separated from each other by radial partitions 24 connecting walls 14, 16 to each other.

Each compartment is delimited:

radially by a corresponding zone of the outer annular wall 14 and a corresponding zone of the inner annular wall 16, and laterally by two radial partitions 24 extending between the two annular walls 14, 16.

The fluid passage vein of the chamber 10 is thus compartmentalized or sectorized, and each compartment is associated with an axial air/oil mixture inlet port 18a, a plurality of radial oil outlets 22, and a radial de-oiled air outlet port 20a.

The external radial outlets 22 are provided in the external wall 14 and are configured to discharge the oil separated from the mixture by the centrifugal force of the degasser.

The de-oiled air outlet port 20a connects each compartment to the internal cavity 13 of the hollow shaft 12 and discharge the air to the outside of the turbomachine.

FIG. 1 also schematically illustrates the movement of the air and oil drops 25 passing through the degasser.

Figures 2A, 2B:
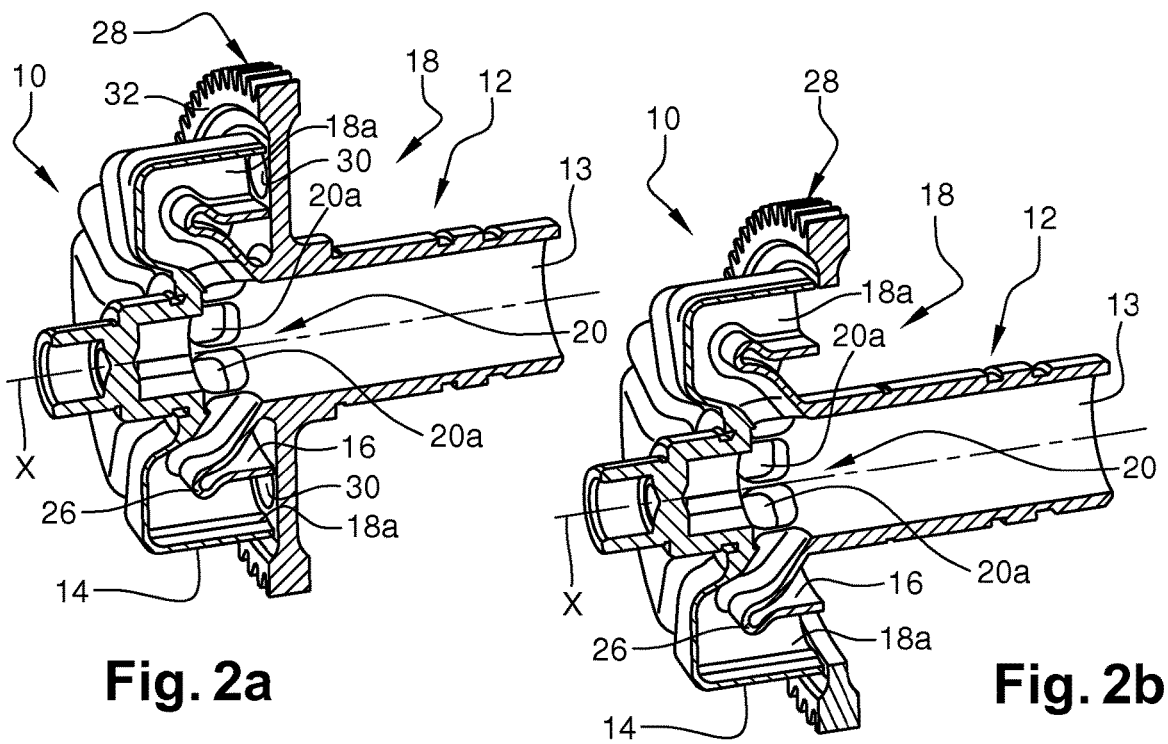
FIG. 2a is a schematic axial section view of a degasser according to the prior art.
FIG. 2b is a schematic axial section view of a degasser according to the, disclosure.

As can be seen in FIGS. 2a and 2b, the degasser also comprises a pinion 28 for rotating the hollow shaft 12. The pinion 28 is arranged at the inlet 18 of the air/oil mixture in the chamber 10 and has at least one axial opening 30 for the air/oil mixture to pass through. This axial opening 30 is in fluid communication with the inlet 18 in order to allow the air/oil mixture to be degassed to enter through pinion 28.

It should be noted, however, that pinion 28 can be fitted anywhere on the degasser. For example, (example not shown) pinion 28 can be arranged behind the degasser. The integration of pinion 28 in the degasser can therefore remove certain limits on the location of the degasser in the turbomachine, for example by no longer limiting the space available for the degasser between the pinion 28 and a bearing. For example, the pinion 28 can be arranged anywhere, axially along the annular wall 14.

As can be seen in FIG. 2a, a prior art pinion 28 comprises a disc 32 with an inner periphery connected to the hollow shaft 12 and an outer periphery with annular teeth. The prior art pinion 28 is thus connected to each of the two inner walls 16 and outer wall 14 of the chamber 10 and thus extends radially between the two inner walls 16 and outer wall 14. Each radial air inlet 18a must therefore be aligned with an axial opening 30 in the disc 32 of the pinion 28.

It should also be noted that in the previous technique a "nut and thread" assembly (not shown) is required to connect the degasser to the pinion 28 and that numerous machining operations are carried out to adjust and centre the parts in relation to each other. In addition, several references must be managed.

FIG. 2b shows that disc 32 of the pinion 28 has disappeared. In fact, since the pinion 28 of the degasser according to the disclosure is a single piece with the chamber 10, there is no need for disc 32 as such to ensure sufficient contact between the pinion 28 and the chamber 10. The obtaining of a single piece comprising the chamber 10 and the pinion 28 can be achieved by means of an additive manufacturing process known per se, as an example of which can be found in document FR3004370.

What is meant by a "single piece" is similar to the meaning given to the expression "monobloc" in the context of production by moulding: the two parts forming a "single piece" are produced at the same time, for example by the same additive manufacturing stage, in the same material and thus form a single-piece unit.

The mass savings obtained by eliminating the axial support of the degasser/pinion on the hollow shaft 12 and by eliminating the disc 32 are significant. In addition, the manufacturing cost is reduced because the production of the part by additive manufacturing practically only requires the grinding of the teeth of the pinion 28 and/or the grinding of the bearing seats on the pinion 28.

In addition, additive manufacturing makes it possible to optimize the geometry of the flow vein, particularly at the transition to the internal cavity 13 of the hollow shaft 12.

However, it can be difficult to manufacture a part using additive manufacturing, as the part can collapse. It may be necessary to add support structures when the part has flat areas of a certain size, as for example shown in FIG. 3a, at the bend 26 of the inner wall 16: It can be seen that the inner wall 16 has a substantially annular part which forms a horizontal plate (at the bend 26). During manufacture, this horizontal plate can collapse between the radial partitions 24 which limit the compartments.

As indicated above, each annular wall 14, 16 has a generally U-shaped cross-section and, in order to reduce the risk of collapse, at least one of the annular walls 14, 16 is connected to the radial partitions 24 by an annular web of material 33 which has an annular row of notches 34 in the shape of an arc of a circle, as shown in FIG. 3b. Each notch 34 thus extends between two adjacent radial partitions 24 and is shaped so that its ends are connected to the adjacent partitions 24 and its concave part faces an annular wall 14, 16. In the example shown in FIG. 3b, the concave part of each notch 34 faces the outer wall 14. The concave part of each notch 34 defines a fluid passage with the outer wall 14, so that air flowing through the vein, when contacting the intrados of the notch 34, passes through the second part P2 of the vein, downstream of the bend 26.

This annular web 33 downstream of the bend 26 also makes it possible to be free from the machining constraints due to conventional machining processes and to be optimized so as to improve the de-oiling capacity of the air/oil mixture and to minimize pressure losses.

As can be seen in FIG. 4, the degasser according to the disclosure may comprises a vortex inhibitor 36, housed in the internal cavity 13 of the hollow shaft 12, at the internal radial outlets 20a. Thus, the outlet 20 of the chamber 10 is placed in fluid communication with internal cavity 13 of the hollow shaft 12 via this vortex inhibitor 36.

The vortex inhibitor 36 prevents the air flow from rotating (rotating called vortex), which leads to high pressure drops, especially at high rotational speeds. This vortex inhibitor 36 comprises, in the example shown, a body 37 of generally conical shape with the tip pointing downstream and centred on the axis X of the degasser. Fins 38 extend radially outwards from this cone and force the air flow entering into the hollow shaft 12 to flow approximately parallel to the axis X. These fins 38 are evenly distributed around the axis X and each vane extends approximately in a radial plane through the axis X.

Figure 5:
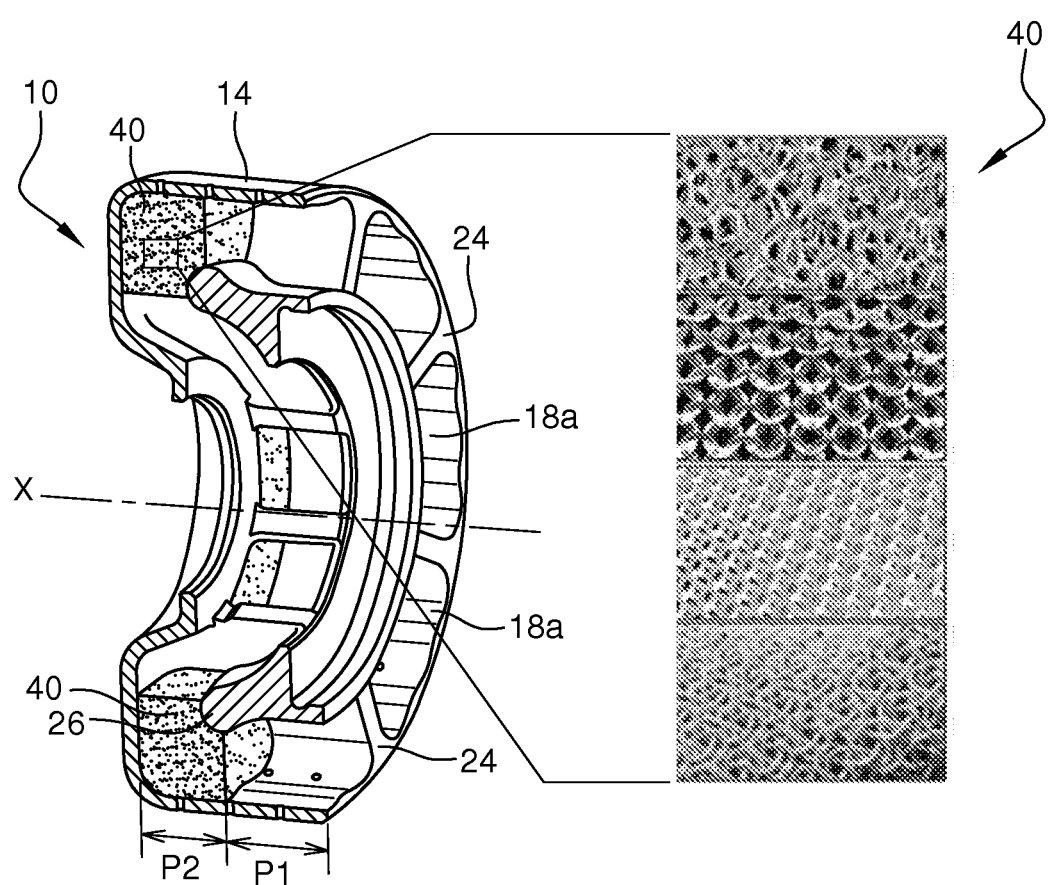
FIG. 5 is a schematic radial cross-sectional view of a degasser chamber according to the disclosure comprising a filter.

In addition, according to an embodiment shown in FIG. 5, the degasser may be fitted with one or more annular, lattice-like honeycomb structures 40 for filtering the finest oil droplets. This honeycomb structure is made by additive manufacture. According to the embodiment shown in FIG. 5, the chamber 10 comprises at least one honeycomb structure 40 in each compartment at the bend 26 of the vein. This honeycomb structure also makes it possible to maintain the original shape of the annular walls 14, 16 in addition to or instead of the notches 34 of the web 33 described above, with reference to FIG. 3b.

The honeycomb structure 40 does not extend fully into the compartments of the vein, so as to form two distinct successive spaces in the compartment: a space free of honeycomb material corresponding to the first part P1 of the vein upstream of the bend 26 and a space lined with honeycomb material at the bend 26. The free space of honeycomb material is fed with mixture through the axial inlets 18a.

The first part P1 of the vein thus has a simple centrifugal function for the first phase of de-oiling.

In the example shown in FIG. 5, the inlet and outlet sides of the honeycomb structure 40 are approximately perpendicular to the wall 14. However, according to an embodiment not shown, each of the inlet and outlet sides of honeycomb structure 40 can be inclined at an angle determined according to parameters chosen by the person skilled in the art. This angle is determined either by manufacturability requirements or with a view to optimizing de-oiling performance and/or pressure loss.

The filled space at the bend 26 (comprising the honeycomb structure 40) has the function of capturing the oil drops not extracted during the first phase and therefore ensures a second phase of de-oiling. This second phase of de-oiling is carried out by the honeycomb structure 40 without significant pressure loss due to the axial attack of the oil drops.

In an embodiment not shown, a gap can be left between the honeycomb structure 40 and the inner surface of the annular wall 14 (at the bend 26), so that the oil centrifuged on this inner surface (resulting from the collection of droplets of the air/oil mixture) is directed as quickly as possible to the ports 22. This prevents these droplets from being re-extracted by the air flow to the internal cavity 13.

In addition, with the additive manufacturing process, it is possible to choose the geometry of the honeycomb structure 40 to maximize its filter function and, as shown in FIG. 5, to vary the texture and porosity of the honeycomb structure, radially and/or axially. Additive manufacturing also allows the manufacture of complex shapes, such as "funnels" around each orifice 22. Variable porosity makes it possible to standardize pressure losses between different areas of the vein.

The texture of the honeycomb structure 40 can also, for example, be in the form of regular and/or irregular fibre interlacing. The orientation favoured by a regular structure can be effective in guiding droplets to the external radial outlets 22 and avoid oil accumulation in the radially outer areas of honeycomb structure 40, which can block airflow.

In an embodiment not shown, it is also possible to vary the texture and porosity in azimuth within each compartment. As with the effects of centrifugal force in the radial direction, this makes it possible to take into account the effects of oil accumulation which can occur against radial partitions 24, for example.

These embodiments allow the honeycomb structure 40 to be adapted to the shape of the vein in such a way that it maximizes the number of droplets captured while minimizing the associated pressure drops.

The additive manufacturing process of the chamber 10, the pinion 28 and, if present, the honeycomb structure 40 and/or the vortex inhibitor 36, takes place simultaneously and allows both a certain degree of freedom in the geometries chosen to circulate the air flow and simply integrates a honeycomb structure 40 and/or a vortex inhibitor 36 capable of increasing the rate of oil droplet capture and improving the air flow in the degasser. The additive manufacturing of the assembly can be done in a known manner by a controlled laser melting process of a metal powder.

Thus, by switching from a degasser formed by a set of a minimum of three part references (the pinion 28, the chamber 10, the nut) to a single part forming a single body which can integrate honeycomb structures 40 and/or vortex 36 inhibitors perfectly adapted to the needs of the degasser in question. Production by additive manufacturing enables the functional requirements of the components to be approached as closely as possible by optimizing the level of performance, in particular with regard to the mass of the assembly and the pressure drop aspect. It is possible to design all kinds of geometries for the degassers and to integrate other functions, such as, for example, inner bearing rings.

The invention claimed is:

1. A centrifugal degasser of an air/oil mixture of a turbomachine, comprising:
    a hollow shaft extending along an axis X and defining an internal air circulation cavity;
    a pinion configured for rotating the hollow shaft; and
    an annular chamber configured for centrifugal separation of said air/oil mixture, the annular chamber being arranged around the hollow shaft and forming a fluid passage vein, the fluid passage vein comprising an inlet oriented axially for feeding the annular chamber with said air/oil mixture, and a first outlet oriented radially inwards for the exit of a de-oiled air portion separated from said air/oil mixture, the first outlet being in fluid communication with said internal air circulation cavity for discharging the de-oiled air portion to an outside of the centrifugal degasser, the annular chamber further comprising a second oil outlet oriented radially outwards and configured for discharging an oil portion separated from said air/oil mixture to the outside of the centrifugal degasser,
    wherein the annular chamber and the pinion form a single piece.

2. The centrifugal degasser according to claim 1, wherein the degasser has an additively manufactured construction.

3. The centrifugal degasser according to claim 1, wherein the annular chamber forms a bend and comprises a first annular part substantially parallel to the axis X and a second annular part extending radially towards the axis X.

4. The centrifugal degasser according to claim 3, further comprising an additively manufactured honeycomb structure housed in the annular chamber.

5. The centrifugal degasser according to claim 4, wherein the additively manufactured honeycomb structure has an evolving shape having a variance of at least one of a texture or a porosity of the honeycomb structure, wherein the variance extends at least one of radially or axially.

6. The centrifugal degasser according to claim 4, wherein the additively manufactured honeycomb structure is part of the single piece which includes the annular chamber and the pinion.

7. The centrifugal degasser according to claim 3, wherein the annular chamber comprises an inner annular wall and an outer annular wall, defining therebetween said fluid passage vein and which are connected together by an annular row of radial partitions which define therebetween degassing compartments, each of the inner and outer annular walls being U-shaped in cross-section and at least one of the inner or outer annular walls being connected to the radial partitions by an annular web having an annular row of notches each notch of the annular row of notches extending between two adjacent radial partitions of the annular row of radial partitions and being shaped so that ends thereof are connected to the two adjacent radial partitions and a concave portion thereof is located opposite the inner or outer annular wall and defines a fluid passage therewith.

8. The centrifugal degasser according to claim 1, wherein the first outlet is in fluid communication with the internal cavity by a vortex inhibitor formed as part of the single piece which includes the annular chamber and the pinion.

9. The centrifugal degasser according to claim 8, wherein the pinion is arranged axially along a wall of the annular chamber and comprises an axial opening configured for passage of the air/oil mixture and which is in fluid communication with said inlet.

10. The centrifugal degasser according to claim 8, wherein the pinion is arranged at the inlet of the annular chamber and comprises an axial opening configured for passage of the air/oil mixture and which is in fluid communication with said inlet.

11. A method of producing a degasser of an air/oil mixture of a turbomachine, the degasser comprising: a hollow shaft extending along an axis X and defining an internal air circulation cavity, a pinion configured for rotating the hollow shaft, and an annular chamber configured for centrifugal separation of said air/oil mixture, the annular chamber being arranged around the hollow shaft and forming a fluid passage vein comprising an inlet oriented axially for feeding the annular chamber with said air/oil mixture, and a first outlet oriented radially inwards for exiting a de-oiled air portion separated from said air/oil mixture, the first outlet being in fluid communication with said internal air circulation cavity for discharging the de-oiled air portion to an outside of the degasser, the annular chamber further comprising a second oil outlet oriented radially outwards and configured for discharging an oil portion separated from said air/oil mixture to the outside of the degasser, the method comprising:
   simultaneously additively manufacturing the pinion and the chamber.

\* \* \* \* \*